(12) United States Patent
Park et al.

(10) Patent No.: US 11,726,573 B2
(45) Date of Patent: Aug. 15, 2023

(54) METHOD FOR PROVIDING HAPTIC FEEDBACK

(71) Applicant: Industry-Academic Cooperation Foundation, Yonsei University, Seoul (KR)

(72) Inventors: No Cheol Park, Seoul (KR); Whee Jae Kim, Seongnam-si (KR); Dong Joon Kim, Seoul (KR); Sang Won Park, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 17/572,996

(22) Filed: Jan. 11, 2022

(65) Prior Publication Data

US 2022/0221936 A1     Jul. 14, 2022

(30) Foreign Application Priority Data

Jan. 12, 2021   (KR) .................. 10-2021-0003663
Jan. 11, 2022   (KR) .................. 10-2022-0004254

(51) Int. Cl.
*G06F 3/01*          (2006.01)

(52) U.S. Cl.
CPC .................. *G06F 3/016* (2013.01)

(58) Field of Classification Search
CPC ........................................ G06F 3/016
See application file for complete search history.

(56) References Cited

U.S. PATENT DOCUMENTS

| 9,958,943 B2 | 5/2018 | Long et al. | |
| 2016/0327980 A1 | 11/2016 | Farahani et al. | |
| 2021/0352399 A1* | 11/2021 | Heilemann | .......... H04R 1/2803 |

FOREIGN PATENT DOCUMENTS

| KR | 1020170054394 A | | 5/2017 | |
| KR | 20170082001 | * | 7/2017 | ............. G06F 3/016 |
| KR | 101829171 B1 | | 2/2018 | |
| KR | 1020210079765 A | | 6/2021 | |

* cited by examiner

*Primary Examiner* — Nelson M Rosario
*Assistant Examiner* — Scott D Au
(74) *Attorney, Agent, or Firm* — The Webb Law Firm

(57) ABSTRACT

A method for providing haptic feedback includes sensing a user's input through a display panel, determining haptic feedback corresponding to the input, and controlling a voltage applied to each of the plurality of actuators to provide the determined haptic feedback to a location where the input is sensed, wherein the controlling of the voltage applied to each of the plurality of actuators includes adjusting the voltage applied to each of the plurality of actuators to reduce the magnitude of radiation noise of the panel due to excitation of the plurality of actuators and to uniformize the magnitude of the noise for each location of the panel.

12 Claims, 7 Drawing Sheets

[FIG. 1]
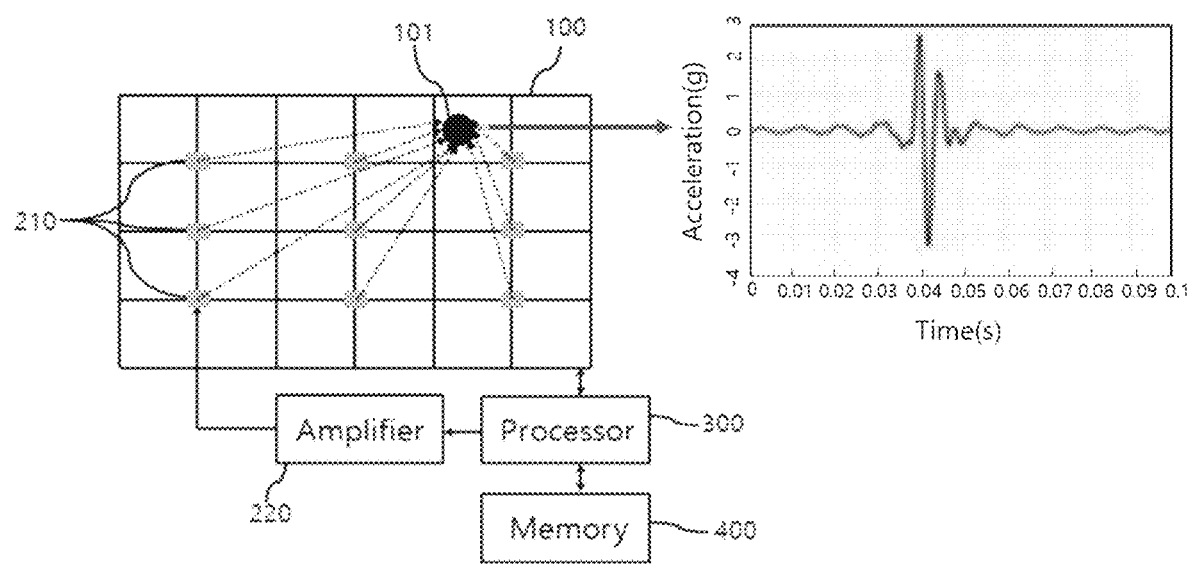

[FIG. 2]
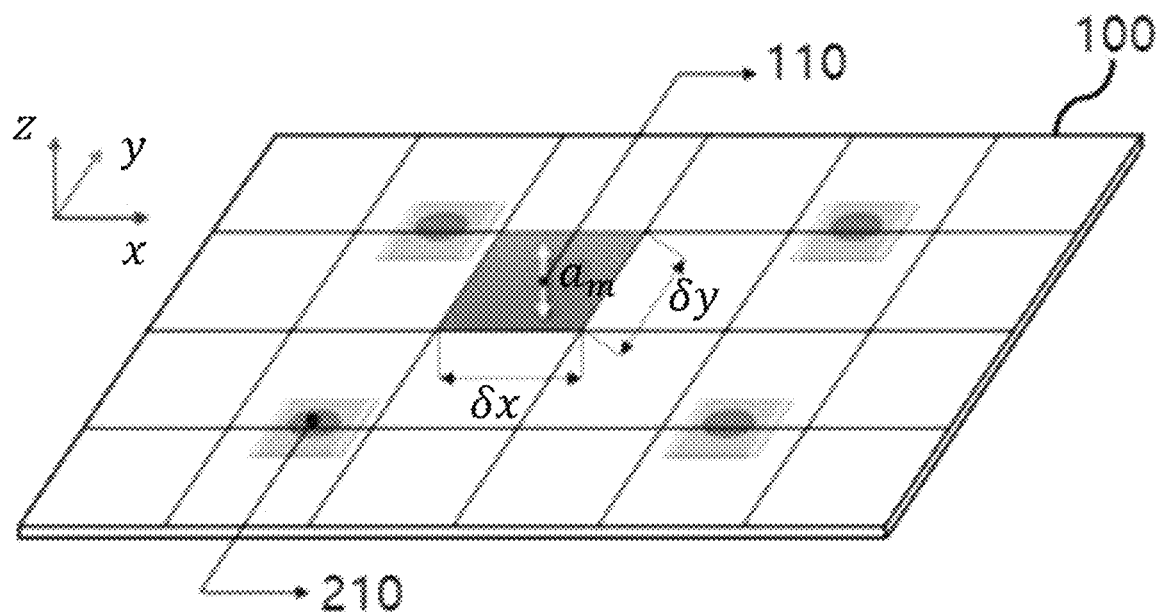

[FIG. 3]
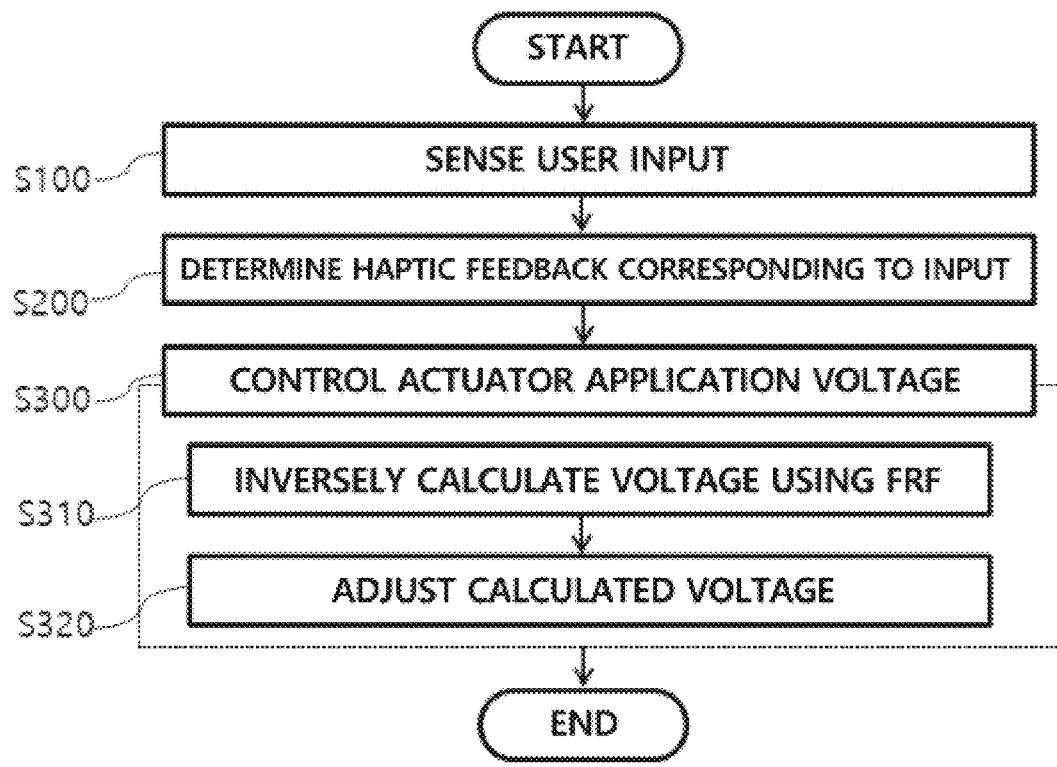

[FIG. 4]
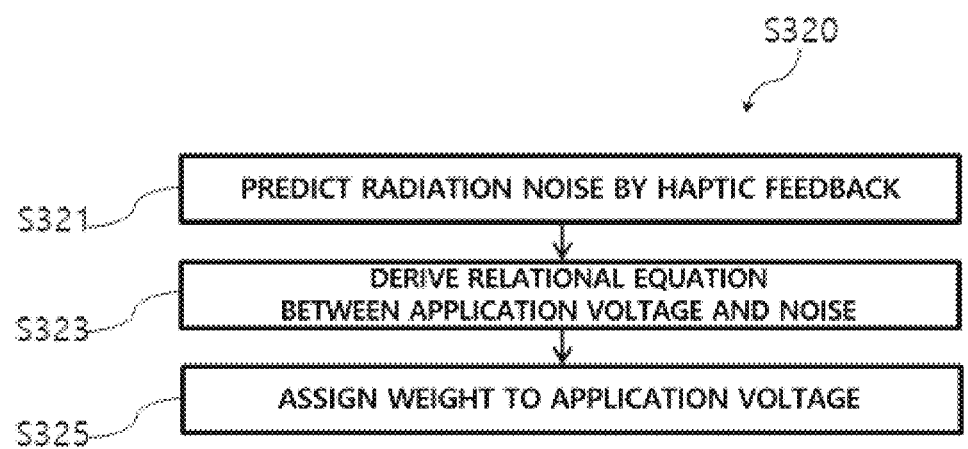

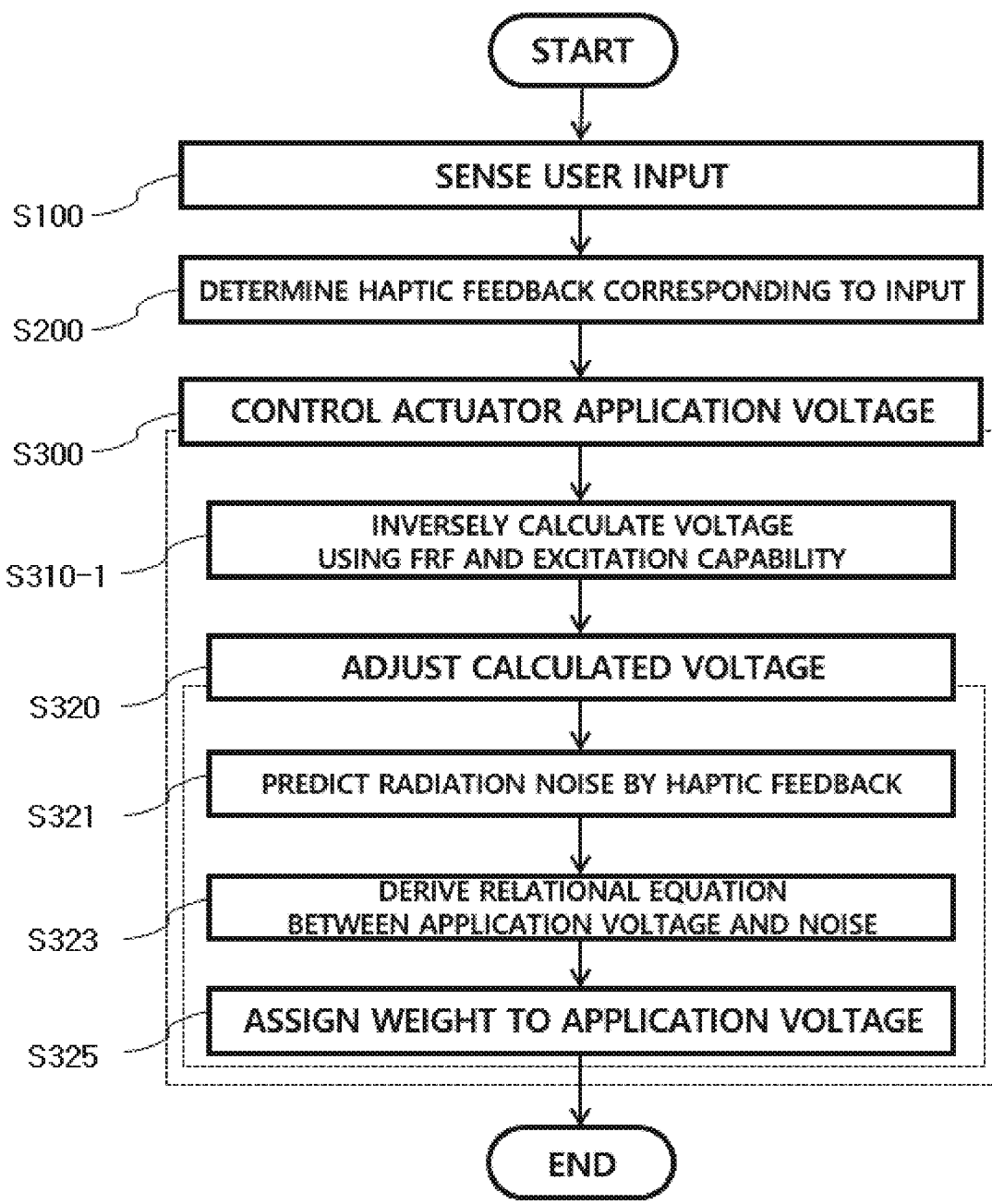
[FIG. 5]

[FIG. 6]
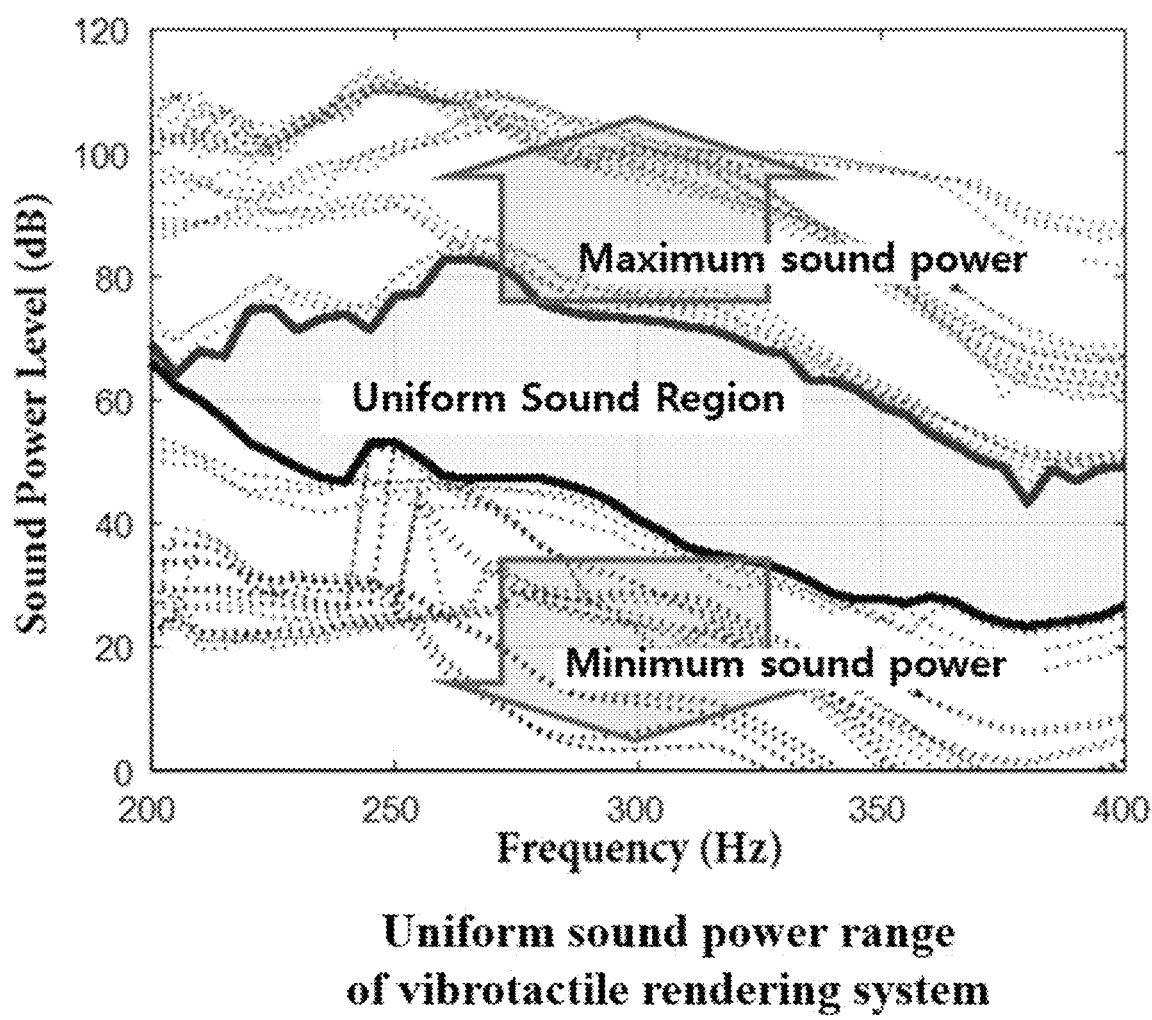
**Uniform sound power range
of vibrotactile rendering system**

[FIG. 7]

| V | Threshold of actuator driving signal($v_{th}$) |

| H | Actuator location,<br>Number of actuators,<br>Actuator Dynamics,<br>Boundary conditions, etc.<br>: |

| R | Geometry of vibrotactile rendering system |

System variables of vibrotactile rendering system

METHOD FOR PROVIDING HAPTIC FEEDBACK

CROSS-REFERENCE TO RELATED APPLICATIONS

This application claims priority to Korean Patent Application Nos. 10-2021-0003663 filed Jan. 12, 2021 and 10-2022-0004254 filed Jan. 11, 2022, the disclosures of which are hereby incorporated by reference in their entirety.

TECHNICAL FIELD

The following disclosure relates to a method for providing haptic feedback, and more particularly, to a method for providing haptic feedback by implementing the haptic feedback using a frequency response function and controlling noise radiated by the implementation of the haptic feedback.

BACKGROUND

Conventionally, a display device served to transmit only images and sounds relying on only sight and hearing. However, recently, display devices to which a haptic technology capable of delivering a tactile sense corresponding to an image when a touch is made with a finger or a pointer such as a stylus pen in a display device including a touch screen are increasing.

Such a haptic technology is widely applied to a mobile device and a display device including an ID (Center Information Display) that provides information to a driver.

The haptic technology needs to provide haptic feedback corresponding to a tactile sense suitable for each touch point variously. In addition, noise is generated while the display panel moves due to the providing of haptic feedback. Noise caused by the haptic feedback has a problem of causing confusion and inconvenience to users. Therefore, it is necessary to reduce noise caused by the haptic feedback or to adjust noise to be radiated uniformly for each touch point.

In addition, although noise is generated according to locations and the number of a plurality of actuators disposed on a display, there is a problem in that a difference in noise occurs according to a shape of the display.

PRIOR TECHNICAL DOCUMENT

Patent Document (Patent Document 0001) 10-2021-0079765 A (Korea Aerospace Research Institute) publication date: Jun. 30, 2021

SUMMARY

Technical Problem

An exemplary embodiment of the present disclosure is directed to providing a method for providing haptic feedback corresponding to a user's input that minimizes noise to be uniformly radiated for each input location while reducing a magnitude of noise radiated due to the haptic feedback.

Technical Solution

In one general aspect, a method for providing haptic feedback by a display device including a display panel, a haptic module including a plurality of actuators exciting a point of the panel, and a processor electrically connected to the panel and controlling the haptic module, includes sensing a user's input through the panel; determining haptic feedback corresponding to the input; and controlling a voltage applied to each of the plurality of actuators to provide the determined haptic feedback to a location where the input is sensed, wherein the controlling of the voltage applied to each of the plurality of actuators includes adjusting the voltage applied to each of the plurality of actuators to reduce a magnitude of radiation noise of the panel due to excitation of the plurality of actuators and to uniformize the magnitude of the noise for each location of the panel.

The controlling of the voltage applied to each of the plurality of actuators may include inversely calculating the voltage applied to each of the plurality of actuators using at least one of a previously measured frequency response function of each of the plurality of actuators so that the determined haptic feedback is implemented at a location where the input is sensed and a mode excitation capability derived from a mode shape.

The controlling of the voltage applied to each of the plurality of actuators may include predicting a magnitude of radiation noise of the panel by excitation of the plurality of actuators using at least one of a surface speed and an acoustic impedance of the panel, and locations and the number of the plurality of actuators disposed on the panel; deriving a relational equation between the voltage applied to each of the plurality of actuators and the magnitude of the radiation noise of the panel; and assigning a weight to the inversely calculated voltage applied to each of the plurality of actuators in a direction in which the magnitude of the radiation noise of the panel is reduced and in a direction in which the magnitude of the noise is uniformized for each location of the panel using the relational equation.

A measurement of the surface speed and the acoustic impedance of the panel may include measuring a surface speed and an acoustic impedance of each unit element that is a part corresponding to a unit area of the panel when the panel is divided in a matrix form.

The determined haptic feedback may be implemented at a location where the input is sensed by the overlapping of excitation of the plurality of actuators with respect to the panel.

In another general aspect, a display device for providing haptic feedback includes a display panel that senses a user's input; a haptic module including a plurality of actuators; and when the input is sensed through the display panel, a processor that determines haptic feedback corresponding to the input and controls the haptic module to provide the determined haptic feedback to a location where the input is sensed, wherein the processor, while controlling a voltage applied to each of the plurality of actuators, adjusts the voltage applied to each of the plurality of actuators to reduce a magnitude of radiation noise of the panel due to excitation of the plurality of actuators and to uniformize the magnitude of the noise for each location of the panel The processor may inversely calculate the voltage applied to each of the plurality of actuators using a previously measured frequency response function of each of the plurality of actuators so that the determined haptic feedback is implemented at a location where the input is sensed.

The processor may predict radiation noise of the panel by excitation of the plurality of actuators using a previously measured surface speed and an acoustic impedance of the panel, derive a relational equation between the voltage applied to each of the plurality of actuators and the radiation noise of the panel, and assign a weight to the inversely calculated voltage applied to each of the plurality of actuators in a direction in which a magnitude of the radiation noise of the panel is reduced and in a direction in which the magnitude of the noise is uniformized for each location of the panel using the relational equation.

A measurement of the surface speed and the acoustic impedance of the panel may include measuring a surface speed and an acoustic impedance of each unit element that is a part corresponding to a unit area of the panel when the panel is divided in a matrix form.

The determined haptic feedback may be implemented at a location where the input is sensed by the overlapping of excitation of the plurality of actuators with respect to the panel.

In another general aspect, a display device for providing haptic feedback includes a display panel that senses a user's input; a haptic module including a plurality of actuators; and when the input is sensed through the display panel, a processor that determines haptic feedback corresponding to the input and controls the haptic module to provide the determined haptic feedback to a location where the input is sensed, wherein the processor, while controlling a voltage applied to each of the plurality of actuators, adjusts the voltage applied to each of the plurality of actuators to reduce a magnitude of radiation noise of the panel due to excitation of the plurality of actuators and to uniformize the magnitude of the noise for each location of the panel, and inversely calculates the voltage applied to each of the plurality of actuators using a previously measured frequency response function of each of the plurality of actuators so that the determined haptic feedback is implemented at a location where the input is sensed and a mode excitation capability derived from a mode shape.

The processor may predict radiation noise of the panel by excitation of the plurality of actuators using at least one of a previously measured surface speed and an acoustic impedance of the panel, and locations and the number of the plurality of actuators disposed on the panel, and assign a weight to the inversely calculated voltage applied to each of the plurality of actuators in a direction in which a magnitude of the radiation noise of the panel is reduced and in a direction in which the magnitude of the noise is uniformized for each location of the panel using a relational equation.

The processor may determine the locations and the number of the plurality of actuators disposed on the panel based on a radiation available noise range of a haptic feedback system so as to maximize the mode excitation capability.

The processor may calculate a surface speed matrix based on a mode shape of the actuator based on [Equation 1] below.

$$(j\omega)^{-1}H = \Psi_{M \times m} \times \Omega_{m \times m} \times (\Psi_A)_{m \times N} \times G_{N \times N}$$ [Equation 1]

Where, $\Psi(M \times n)$ denotes a mode shape of a system for providing haptic feedback, and $\Omega(m \times m)$ denotes a natural frequency of each of the plurality of actuators, $\Psi_A(m \times N)$ denotes involvement of an element of a mode, H denotes a frequency response function matrix of the system for providing haptic feedback, $G(N \times N)$ denotes a dynamic characteristic of an actuator, and $j\omega$ denotes an angular frequency.

Advantageous Effects

As set forth above, according to the present disclosure, the method for providing haptic feedback may provide various types of haptic feedback corresponding to the user's input, reduce radiation noise generated when implementing the haptic feedback, and uniformize the noise for each input point.

The effects obtainable in the present disclosure are not limited to the above-mentioned effects, and other effects not mentioned may be clearly understood by those of ordinary skill in the art to which the present disclosure belongs from the following description.

BRIEF DESCRIPTION OF THE DRAWINGS

FIG. 1 is a display device that provides haptic feedback according to an embodiment of the present disclosure.

FIG. 2 is a diagram for explaining noise adjustment of a display device providing haptic feedback according to an embodiment of the present disclosure.

FIG. 3 is a flowchart of a method for providing haptic feedback according to an embodiment of the present disclosure.

FIG. 4 is a flowchart illustrating step S320 of FIG. 3 according to an embodiment of the present disclosure.

FIG. 5 is a flowchart of a first embodiment according to an embodiment of the present disclosure.

FIG. 6 is a graph showing a magnitude of noise according to a frequency according to an embodiment of the present disclosure.

FIG. 7 is a table illustrating variables of haptic feedback device according to an embodiment of the present disclosure.

DETAILED DESCRIPTION OF EMBODIMENTS

Hereinafter, the preferred embodiments of the present disclosure will be described in more detail with reference to the accompanying drawings.

The terms used in the present specification are terms defined in consideration of the functions of the present disclosure, which may vary according to the intention or precedent of a user or an operator. Therefore, definitions of these terms should be made based on the description throughout the present specification.

In addition, the embodiments disclosed below do not limit the scope of the present disclosure, but are merely exemplary matters of the components presented in the claims of the present disclosure. Embodiments that are included in the technical spirit throughout the specification of the present disclosure and that include substitutable components as equivalents in the components of the claims may be included in the scope of the present disclosure.

And the terms such as "first", "second", "one side", "other side", etc. in the embodiments disclosed below are used to distinguish one component from other element, and the component is not limited by the terms. Hereinafter, in describing the present disclosure, detailed description of known techniques that may obscure the gist of the present disclosure will be omitted.

FIG. 1 is a display device that provides haptic feedback according to an embodiment of the present disclosure.

Referring to FIG. 1, a display device for providing the haptic feedback according to an embodiment of the present disclosure includes a display panel 100, a haptic module 200, and a processor 300.

The display panel 100 transmits visual information to a user, and includes a touch panel that senses a user input, that is, a touch of a finger or a stylus fan. The display panel 100 is formed in a plate shape in which a panel emitting light and touch panels are stacked. Accordingly, the display panel 100 displays information that induces a user's input, and senses the user's input when the user inputs a touch of a finger or the like with respect to visual information on the display panel.

The haptic module 200 includes a plurality of actuators 210 and an amplifier 220 supplying power to the plurality of actuators, and provides the haptic feedback at a point where the user's input is sensed by exciting the display panel by driving of the plurality of actuators.

In other words, the haptic feedback is implemented at the point of the user's input by adding the excitation to the display panel by each of the plurality of actuators.

Here, the haptic feedback is a tactile sense that may be felt when touching an object, and includes a tactile feedback felt when the skin touches a surface of the object and a kinesthetic force feedback felt when movement of joints and muscles is disturbed. In the present specification, the term "haptic feedback" is used to encompass such a concept.

In the illustrated embodiment, the plurality of actuators 210 are disposed on a rear surface opposite to a front surface of the display panel providing visual information to the user, and are disposed to form patterns having regularity, for example, a matrix shape.

The plurality of actuators 210 may include a piezoelectric element, an element inducing deformation by heat, an ultrasonic transducer, etc., and even any type of configuration that may transmit vibration to the display panel by an applied voltage may be applied.

The processor 300 is a configuration that controls the haptic module 200, and is electrically connected to the display panel 100, the haptic module 200, and the memory 400. When the user's input is sensed through the display panel, the processor 300 determines haptic feedback corresponding to the user's input, and controls the haptic module to provide the determined haptic feedback to a location 101 where the user's input is sensed.

At this time, the processor 300 determines a waveform and intensity of a voltage applied to each of the plurality of actuators 210, and transmits the corresponding application voltage signal of each of the plurality of actuators 210 determined as a control signal.

The processor 300 may control the haptic module 200 by executing a program command stored in the memory 400 so that the display device providing the haptic feedback according to the present disclosure performs a method for providing the haptic feedback according to the present disclosure which will be described below.

The processor 300 determines the haptic feedback corresponding to the user's input sensed by the display panel 100. Various kinds of haptic feedback may be provided by the display device, and the haptic feedback provided is differently determined according to the type of visual information provided by the display panel or the user's input. The kind of haptic feedback corresponding to the user's input is previously stored in the memory 400, and the processor 300 receives information about the haptic feedback corresponding to the user's input from the memory 400 and determines the haptic feedback.

At this time, the information about the haptic feedback may be a location on the display panel where the user's input is sensed and a vibration waveform of the haptic feedback that needs to be provided to the location.

The processor 300 controls the voltage applied to each of the plurality of actuators 210 so that the determined haptic feedback is provided to the location where the user's input is sensed. Here, the haptic feedback is implemented by the overlapping of excitation with respect to the display panel by the plurality of actuators.

The processor 300 inversely calculates the voltage applied to each of the plurality of actuators using a previously measured frequency response function (FRF) of each of the plurality of actuators, and adjusts the voltage applied to each of the plurality of actuators to reduce the magnitude of radiation noise of the display panel due to the excitation of the plurality of actuators and uniformize the magnitude of the noise for each location of the display panel.

The processor 300 inversely calculates the voltage applied to each of the plurality of actuators using the previously measured FRF of each of the plurality of actuators so that the determined haptic feedback is implemented at the location 101 where the input is sensed.

Here, the FRF of each of the plurality of actuators is a function representing a vibration response that each of the plurality of actuators excites the display panel by an applied voltage according to a frequency of the applied voltage when the voltage of a waveform having various frequencies is applied to each of the plurality of actuators. The FRF of each of the plurality of actuators is previously measured in the same way as described above and stored in the memory 400.

The processor 300 expresses the FRF of each of the plurality of actuators in a matrix in order for the haptic feedback determined by the overlapping of the excitation with respect to the display panel 100 by the plurality of actuators 210 to be implemented at the location 101 where the input is sensed, and inversely calculates the voltage applied to each of the plurality of actuators through the product of an inverse matrix of a matrix of the FRF of each of the plurality of actuators and the vibration waveform of the determined haptic feedback.

The processor 300 adjusts the voltage applied to each of the plurality of actuators calculated by the product of the inverse matrix of the matrix of the FRF of each of the plurality of actuators and the vibration waveform of the determined haptic feedback. Accordingly, the display device according to the present disclosure may generally reduce the magnitude of the radiation noise of the display panel due to the excitation of the plurality of actuators, prevent the magnitude of the noise from being non-uniformly radiated for each location of the display panel to which the haptic feedback is provided, and when the noise includes a tone that may convey discomfort to the user, remove the noise, and provide the haptic feedback corresponding to the input's input.

The processor 300 predicts noise radiated from the panel by excitation of the plurality of actuators using a previously measured surface speed and an acoustic impedance of the display panel. The radiated noise may be predicted by being expressed in an intensity according to the frequency.

FIG. 2 is a diagram for explaining noise adjustment of a display device providing haptic feedback according to an embodiment of the present disclosure.

Referring to FIG. 2, measurement of a surface speed and an acoustic impedance of a display panel is performed by virtually dividing the display panel in matrix form, measuring the surface speed and the acoustic impedance of divided pieces, that is, a unit element 110 which is a part corresponding to a unit area of the panel, and presenting the surface speed and the acoustic impedance in matrix form. Here, it is assumed that the unit element 110 is one sound source emitting an acoustic wave.

The surface speed of the unit element 110 is measured by measuring a motion state caused by vibration of a unit element generated when the display panel is excited by driving of a plurality of actuators. In addition, the acoustic impedance of the unit element is determined by characteristics such as mass and area of the unit element.

The processor 300 predicts the noise radiated by the display panel when each of the plurality of actuators is driven by a voltage applied to each of the plurality of actuators calculated as the product of an inverse matrix of a matrix of a FRF of each of the plurality of actuators and a vibration waveform of the determined haptic feedback using the matrix that is a set of surface speed and acoustic impedance of a plurality of unit elements.

The processor 300 derives a constant relational equation between the voltage applied to each of the plurality of actuators and the radiation noise of the display panel predicted using the surface speed and the acoustic impedance of the display panel.

The processor 300 assigns a weight to the voltage applied to each of the plurality of actuators calculated as the product of the inverse matrix of the matrix of the FRF of each of the plurality of actuators and the vibration waveform of the determined haptic feedback so as to be controlled in a direction in which the magnitude of the radiation noise of the display panel decreases and a difference in the magnitude of the noise for each display location is uniformized using the derived relational equation.

The processor 300 transmits a control signal to the haptic module so that the voltage to which weight is assigned in consideration of the radiation noise of the panel is applied to each of the plurality of actuators. Accordingly, the display device providing the haptic feedback according to the present disclosure may reduce noise that may give a user discomfort and simultaneously provide the haptic feedback corresponding to a user's input to the user accurately.

FIG. 3 is a flowchart of a method for providing haptic feedback according to an embodiment of the present disclosure, and FIG. 4 is a flowchart illustrating step S320 of FIG. 3.

Referring to FIGS. 3 and 4, the method for providing haptic feedback according to an embodiment of the present disclosure includes a step (S100) of sensing a user's input, a step (S200) of determining the haptic feedback corresponding to the input, and a step (S300) of controlling a voltage applied to each of a plurality of actuators included in a haptic module, and is performed by a display device including a display panel, a haptic module including the plurality of actuators exciting a point of the display panel, and a processor electrically connected to the display panel and controlling the haptic module.

In step S100, the user's input is sensed through the display panel. As described above, the display panel provides visual information to the user and simultaneously senses the user's input, for example, a touch by a finger or a stylus pen. In the present step, the display panel senses the user's input and transmits information about a location of the sensed user's input to the processor.

In step S200, the processor determines the haptic feedback corresponding to the user's input sensed in step S100. Various kinds of haptic feedback are provided by the display device, and the haptic feedback provided is differently determined according to the type of visual information provided by the display panel or the user's input. The kind of haptic feedback corresponding to the user's input is previously stored in a memory, and the processor receives information about the haptic feedback corresponding to the user's input from the memory and determines the haptic feedback. At this time, the information about the haptic feedback may be a location on the display panel where the user's input is sensed and a vibration waveform of the haptic feedback to be provided to the location.

In step S300, the processor controls the voltage applied to each of the plurality of actuators so that the haptic feedback determined in step S200 is provided to the location where the user's input is sensed. Here, the haptic feedback is implemented by the overlapping of excitation with respect to the display panel by the plurality of actuators.

Step S300 includes a step (S310) of inversely calculating the voltage applied to each of the plurality of actuators using at least one of a previously measured frequency response function (FRF) of each of the plurality of actuators and a mode excitation capability of the plurality of actuators and a step (S320) of adjusting the voltage applied to each of the plurality of actuators to reduce the magnitude of radiation noise of the display panel due to the excitation of the plurality of actuators and uniformize the magnitude of the noise for each location of the display panel.

In addition, the FRF may be changed by changing the number and locations of the plurality of actuators in order to solve different noises for each location of the display panel. According to the changed FRF, it is possible to extend a noise range that haptic feedback device may radiate. More specifically, as described above, the FRF is changed according to a change of the actuator, and the FRF including a mode shape may determine (recognize) a mode excitation capability dependent on the change of the actuator. As a result, a radiation available noise range of the haptic feedback device is extended by maximizing the mode excitation capability. Here, it is preferable that locations or the number of the plurality of actuators disposed on the panel is related to the excitation capability.

The above description satisfies [Equation 1] below.

$$(j\omega)^{-1} H = \Psi_{M \times m} \times \Omega_{m \times m} \times (\Psi_A)_{m \times N} \times G_{N \times N} \qquad \text{[Equation 1]}$$

M/m/N represents a row and a column of a matrix, and [Equation 1] described above may be derived through [Equation 2] below, $$u = \Psi \times \Omega \times \Psi_A \times A \to u = (j\omega)^{-1} H \times v = \Psi \times \Omega \times \Psi_A \times G \times v \qquad \text{[Equation 2]}$$

Solving Equations 1 and 2 results in [Equation 3] below, and $$u(x, y) = A_i \sum_{n=1}^{\infty} \frac{j\omega \psi_n^j \psi_n(x, y)}{\Lambda_n(\omega_n^2(1 + j\eta_n) - \omega^2)} = \qquad \text{[Equation 3]}$$

$$A_i \sum_{n=1}^{\infty} \left[\frac{\psi_n(x, y)}{\Lambda_n}\right] \left[\frac{j\omega}{[\omega_n^2(1 + j\eta_n) - \omega^2]}\right] [\psi_n^j],$$

$$\left(A_i = \int_s p(x, y) dx dy\right)$$

in Equation 3 above, u denotes a surface speed matrix, Ψ denotes a mode shape and an operating frequency of the haptic feedback device, Ω denotes a natural frequency, Γ denotes a mode participation coefficient for each location, A denotes an excitation input of the actuator, H denotes an FRF matrix of a system, V denotes an input voltage, G denotes a dynamic characteristic of the actuator, η denotes a damping ratio, ω denotes an angular frequency (jω), Ψ denotes a mode shape, and Λ denotes a modal mass.

In step S310, the voltage applied to each of the plurality of actuators is inversely calculated using the previously measured FRF of each of the plurality of actuators so that the haptic feedback determined in step S200 is implemented at the location where the input is sensed.

Here, the FRF of each of the plurality of actuators is a function representing a vibration response that each of the plurality of actuators excites the display panel by an applied voltage according to a frequency of the applied voltage when the voltage of a waveform having various frequencies is applied to each of the plurality of actuators. The FRF of each of the plurality of actuators is previously measured in the same way as described above and stored in the memory.

In step S310, the FRF of each of the plurality of actuators is expressed as a matrix in order for the haptic feedback determined in step S200 by the overlapping of the excitation with respect to the display panel by the plurality of actuators to be implemented at the location where the input is sensed, and the voltage applied to each of the plurality of actuators is inversely calculated through the product of an inverse matrix of a matrix of the FRF of each of the plurality of actuators and a vibration waveform of the haptic feedback determined in step S200.

In step S320, the voltage applied to each of the plurality of actuators calculated in step S310 is adjusted, thereby generally reducing the magnitude of the radiation noise of the display panel due to the excitation of the plurality of actuators, preventing the magnitude of the noise from being non-uniformly radiated for each location of the display panel to which the haptic feedback is provided, and when the noise includes a tone that may convey discomfort to the user, removing the noise.

Referring to FIG. 4, step S320 includes a step (S321) of predicting radiation noise by the haptic feedback, a step (S323) of deriving a relational equation between the application voltage and the radiation noise, and a step (S325) of assigning a weight to the application voltage.

In step S321, noise radiated from the panel by excitation of the plurality of actuators is predicted using the previously measured surface speed and the acoustic impedance of the display panel.

The radiated noise may be predicted by being expressed in an intensity according to the frequency.

Measurement of a surface speed and an acoustic impedance of a display panel, as shown in FIG. 2, is performed by virtually dividing the display panel in matrix form, measuring the surface speed and the acoustic impedance of divided pieces, that is, a unit element which is a part corresponding to a unit area of the panel, and presenting the surface speed and the acoustic impedance in matrix form. Here, it is assumed that the unit element is one sound source emitting an acoustic wave.

The surface speed of the unit element is measured by measuring a motion state caused by vibration of a unit element generated when the display panel is excited by driving of a plurality of actuators. In addition, the acoustic impedance of the unit element is determined by characteristics such as mass and area of the unit element.

In step S321, the noise radiated by the display panel is predicted when each of the plurality of actuators is driven by the voltage applied to each of the plurality of actuators calculated in step S310 using the matrix that is a set of a surface speed and an acoustic impedance of a plurality of unit elements.

In step S323, a constant relational equation between the voltage applied to each of the plurality of actuators and the radiation noise of the display panel predicted using the surface speed and the acoustic impedance of the display panel in step S321 is derived.

In step S325, a weight is assigned to the voltage applied to each of the plurality of actuators calculated in step S310 so as to be controlled in a direction in which the magnitude of the radiation noise of the display panel decreases and a difference in the magnitude of the noise for each display location is uniformized using the relational equation derived in step S323.

<Display Device Providing Haptic Feedback Including Excitation Capability>

The display device providing the haptic feedback described above inversely calculates the voltage applied to each of the plurality of actuators through at least one of the FRF of each of the plurality of actuators and the excitation capability derived from the mode shape. Preferably, the applied voltage is inversely calculated based on the FRF and the excitation capability of each of the plurality of actuators. Although the feedback suitable for the location input by the user may be generated through the FRF, this is because variables for boundary conditions and surrounding environments are different for each location of the display panel, the display device predicts the magnitude of the radiation noise of the panel by excitation based on the excitation ability of the actuator so that different noises (sound generated during use) are uniformized for each location of the user's input, derives the relational equation between the voltage and the magnitude of the radiation noise of the panel, and assigns the weight to the inversely calculated voltage to be applied to each of the plurality of actuators in a direction in which the magnitude of the noise is uniformized through the derived relational equation.

In addition, it is possible to optimize the location and the number of each of the plurality of actuators in which the excitation capability of the plurality of actuators is maximized. The optimized actuator includes a large range of radiated sound level, which will be described in detail with reference to another drawing.

As shown in FIG. 5, in step S310-1 included in step S300 of controlling the voltage applied to the actuator through the same steps as steps S100 to S200 shown in FIGS. 3 to 4, the voltage to be applied to the actuator is inversely calculated based on the excitation capability of each of the plurality of actuators together with the frequency response function (FRF). At this time, it is preferable to inversely calculate the voltage on the basis of the FRF and the excitation capability based on the previously input equation.

In addition, in the step of adjusting the calculated voltage or applying the voltage to each of the plurality of actuators, a step of deriving the relational equation is performed through prediction after a step of predicting the noise to be radiated according to the voltage applied to each of the plurality of actuators. At this time, the relationship (equation) with the noise is derived by reflecting locations and the number of the plurality of actuators to the application voltage.

Finally, in order to provide the feedback according to a user's input, a step of assigning a weight to the voltage applied to a core actuator among the plurality of operating actuators may be performed.

As shown in FIG. 6, this is a graph showing the relationship between the frequency and the magnitude (strength or level) of noise, where the noise may mean sound generated through a touch on the display. The noise is generated according to locations and the number of the plurality of actuators disposed on the display, but a difference in noise occurs according to a shape of the display.

For example, since components constituting the display are different in the edge and the center of the display, and the number of adjacent actuators is also different, the noise varies according to the location of the display. In such a phenomenon, large region of radiation sound level may be implemented, thereby allowing noise that may vary according to the location of the display to be generated as the same or similar noise in any region of the display through overlapping of frequencies included in the noise region.

Additionally, in a table listing elements acting on the haptic feedback device as shown in FIG. 7, V includes an operating limit value of an actuator, H includes locations and the number of actuators, and variables related to actuators including dynamic characteristics and boundary conditions of the actuators, and R includes a surrounding environment in which a device including a geometry where the haptic feedback device operates, operates.

DESCRIPTION OF REFERENCE NUMERALS

100: display panel
210: actuator
300: processor
400: memory
S100: step of sensing user input
S200: step of determining haptic feedback corresponding to input
S300: step of controlling actuator application voltage
S310: step of inversely calculating voltage
S310-1: step of inversely calculating voltage
S320: step of adjusting calculated voltage
S321: predicting radiation noise by haptic feedback
S323: step of deriving relational equation between application voltage and noise
S325: assigning weight to application voltage

What is claimed is:

1. A method for providing haptic feedback by a display device including a display panel, a haptic module including a plurality of actuators exciting a point of the panel, and a processor electrically connected to the panel and controlling the haptic module, the method comprising:
   sensing a user's input through the panel;
   determining haptic feedback corresponding to the input;
   controlling a voltage applied to each of the plurality of actuators to provide the determined haptic feedback to a location where the input is sensed,
   wherein the controlling of the voltage applied to each of the plurality of actuators includes adjusting the voltage applied to each of the plurality of actuators to reduce a magnitude of radiation noise of the panel due to excitation of the plurality of actuators and to uniformize the magnitude of the noise for each location of the panel, and
   inversely calculating the voltage applied to each of the plurality of actuators using at least one of a previously measured frequency response function of each of the plurality of actuators and a mode excitation capability derived from a mode shape, so that the determined haptic feedback is implemented at a location where the input is sensed.

2. The method of claim 1, wherein
   the controlling of the voltage applied to each of the plurality of actuators includes
   predicting a magnitude of radiation noise of the panel by excitation of the plurality of actuators using at least one of a surface speed and an acoustic impedance of the panel, and locations and number of the plurality of actuators disposed on the panel;
   deriving a relational equation between the voltage applied to each of the plurality of actuators and the magnitude of the radiation noise of the panel; and
   assigning a weight to the inversely calculated voltage applied to each of the plurality of actuators in a direction in which the magnitude of the radiation noise of the panel is reduced and in a direction in which the magnitude of the noise is uniformized for each location of the panel using the relational equation.

3. The method of claim 2, wherein
   a measurement of the surface speed and the acoustic impedance of the panel includes measuring a surface speed and an acoustic impedance of each unit element that is a part corresponding to a unit area of the panel when the panel is divided in a matrix form.

4. The method of claim 1, wherein
   the determined haptic feedback is implemented at a location where the input is sensed by overlapping of excitation of the plurality of actuators with respect to the panel.

5. A display device for providing haptic feedback, the display device comprising:
   a display panel that senses a user's input;
   a haptic module including a plurality of actuators; and
   when the input is sensed through the display panel, a processor that determines haptic feedback corresponding to the input and controls the haptic module to provide the determined haptic feedback to a location where the input is sensed,
   wherein the processor,
   while controlling a voltage applied to each of the plurality of actuators, adjusts the voltage applied to each of the plurality of actuators to reduce a magnitude of radiation noise of the panel due to excitation of the plurality of actuators and to uniformize the magnitude of the noise for each location of the panel, and
   inversely calculates the voltage applied to each of the plurality of actuators using a previously measured frequency response function of each of the plurality of actuators so that the determined haptic feedback is implemented at a location where the input is sensed.

6. The display device of claim 5, wherein
   the processor predicts radiation noise of the panel by excitation of the plurality of actuators using a previously measured surface speed and an acoustic impedance of the panel, derives a relational equation between the voltage applied to each of the plurality of actuators and the radiation noise of the panel, and assigns a weight to the inversely calculated voltage applied to each of the plurality of actuators in a direction in which a magnitude of the radiation noise of the panel is reduced and in a direction in which the magnitude of the noise is uniformized for each location of the panel using the relational equation.

7. The display device of claim 6, wherein
   a measurement of the surface speed and the acoustic impedance of the panel includes measuring a surface speed and an acoustic impedance of each unit element that is a part corresponding to a unit area of the panel when the panel is divided in a matrix form.

8. The display device of claim 5, wherein
   the determined haptic feedback is implemented at a location where the input is sensed by overlapping of excitation of the plurality of actuators with respect to the panel.

9. A display device for providing haptic feedback, the display device comprising:
a display panel that senses a user's input;
a haptic module including a plurality of actuators; and
when the input is sensed through the display panel, a processor that determines haptic feedback corresponding to the input and controls the haptic module to provide the determined haptic feedback to a location where the input is sensed,
wherein the processor,
while controlling a voltage applied to each of the plurality of actuators, adjusts the voltage applied to each of the plurality of actuators to reduce a magnitude of radiation noise of the panel due to excitation of the plurality of actuators and to uniformize the magnitude of the noise for each location of the panel, and inversely calculates the voltage applied to each of the plurality of actuators using a previously measured frequency response function of each of the plurality of actuators so that the determined haptic feedback is implemented at a location where the input is sensed and a mode excitation capability derived from a mode shape.

10. The display device of claim 9, wherein
the processor predicts radiation noise of the panel by excitation of the plurality of actuators using at least one of a previously measured surface speed and an acoustic impedance of the panel, and locations and number of the plurality of actuators disposed on the panel, and assigns a weight to the inversely calculated voltage applied to each of the plurality of actuators in a direction in which a magnitude of the radiation noise of the panel is reduced and in a direction in which the magnitude of the noise is uniformized for each location of the panel using a relational equation.

11. The display device of claim 10, wherein
the processor determines the locations and number of the plurality of actuators disposed on the panel based on a radiation available noise range of a haptic feedback system so as to maximize the mode excitation capability.

12. The display device of claim 11, wherein
the processor calculates a surface speed matrix based on a mode shape of the actuator based on [Equation 1] below.

$$(j\omega)^{-1}H = \Psi_{M \times m} \times \Omega_{m \times m} \times (\Psi_A)_{m \times N} \times G_{N \times N} \quad \text{[Equation 1]}$$

(Where, $\Psi(M \times n)$ denotes a mode shape of a system for providing haptic feedback,
$\Omega(m \times m)$ denotes a natural frequency of each of the plurality of actuators, $\Psi A(m \times N)$ denotes involvement of an element of a mode, H denotes a frequency response function matrix of the system for providing haptic feedback, $G(N \times N)$ denotes a dynamic characteristic of an actuator, and $j\omega$ denotes an angular frequency.

* * * * *